(12) United States Patent
Park et al.

(10) Patent No.: US 8,143,319 B2
(45) Date of Patent: *Mar. 27, 2012

(54) METHOD AND APPARATUS FOR STEAM HYDRO-GASIFICATION WITH INCREASED CONVERSION TIMES

(75) Inventors: Chan Seung Park, Yorba Linda, CA (US); Joseph M. Norbeck, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/218,653

(22) Filed: Jul. 16, 2008

(65) Prior Publication Data

US 2008/0312348 A1    Dec. 18, 2008

Related U.S. Application Data

(63) Continuation-in-part of application No. 11/489,353, filed on Jul. 18, 2006, now abandoned, and a continuation-in-part of application No. 11/879,267, filed on Jul. 16, 2007, now Pat. No. 7,619,012.

(51) Int. Cl.
*C07C 27/00* (2006.01)
(52) U.S. Cl. ........ 518/700; 518/703; 518/704; 518/705; 518/706
(58) Field of Classification Search ........... 518/700–706
See application file for complete search history.

(56) References Cited

U.S. PATENT DOCUMENTS

| | | | |
|---|---|---|---|
| 3,917,468 A | 11/1975 | Van Den Berg | |
| 3,957,460 A | 5/1976 | Lee | |
| 3,985,519 A | 10/1976 | Kalina et al. | |
| 4,012,311 A | 3/1977 | Greene | |
| 4,073,698 A | 2/1978 | Blurton et al. | |
| 4,158,697 A | 6/1979 | Cramer | |
| 4,385,905 A | 5/1983 | Tucker | |
| 4,394,239 A | 7/1983 | Kitzelmann et al. | |
| 4,397,888 A | 8/1983 | Yannopoulos et al. | |
| 4,560,547 A | 12/1985 | Schora et al. | |
| 4,822,935 A | 4/1989 | Scott | |
| 4,833,171 A | 5/1989 | Sweeney | |
| 4,983,296 A | 1/1991 | McMahon et al. | |
| 5,250,175 A | 10/1993 | Des Ormeaus | |
| 5,344,848 A | 9/1994 | Steinberg et al. | |
| 5,439,580 A | 8/1995 | Akbar et al. | |
| 5,447,559 A | 9/1995 | Rao et al. | |
| 5,498,827 A | 3/1996 | Khan et al. | |
| RE35,377 E | 11/1996 | Steinert et al. | |
| 5,656,044 A | 8/1997 | Bishop | |
| 6,053,954 A | 4/2000 | Anderson et al. | |
| 6,225,358 B1 | 5/2001 | Kennedy | |
| 6,350,288 B1 | 2/2002 | Hirayama et al. | |
| 6,495,610 B1 | 12/2002 | Brown | |
| 6,527,980 B1 | 3/2003 | Roden et al. | |
| 6,612,269 B2 | 9/2003 | Heffel et al. | |
| 7,208,530 B2 | 4/2007 | Norbeck et al. | |
| RE40,419 E | 7/2008 | Norbeck et al. | |
| 2003/0022035 A1 | 1/2003 | Galloway | |
| 2005/0032920 A1 | 2/2005 | Norbeck et al. | |
| 2005/0165261 A1 | 7/2005 | Abazzajiian et al. | |
| 2005/0256212 A1 | 11/2005 | Norbeck et al. | |
| 2008/0021123 A1 | 1/2008 | Norbeck et al. | |

FOREIGN PATENT DOCUMENTS

| | | |
|---|---|---|
| EP | 0 952 132 A1 | 10/1999 |
| WO | WO03/066517 A1 | 8/2003 |
| WO | PCT/US07/16153 | 7/2007 |

OTHER PUBLICATIONS

A.S.K. Raju, C.S. Park and J.M. Norbeck, Synthesis Gas Production using Steam Hydrogasification and Steam Reforming, Accepted, Fuel Proc. Tech., 2008.

V.P. Natarajan and G.J. Supes, Rheological studies on a slurry biofuel to aid in evaluating its suitability as a fuel, Fuel, vol. 76, 1997, pp. 1527-2535.

G. Atesok, F. Boylu, A.A. Sirkeci and H. Dincer, The effect of coal properties on the viscosity of coal-water slurries, Fuel, vol. 81, 2002, pp. 1855-1858.

F. Boylu, H. Dincer and G. Atesok, Effect of coal particle size distribution, volume fraction and rank on the rheology of coal-water slurries, Fuel Proc. Tech., vol. 85, 2004, pp. 241-250.

N. V. Pimenova and T. R. Hanley, Measurement of rheological properties of corn stover susspensions, App. Biochem. and Biotech., vol. 105-108, 2003, pp. 383-392.

H. A. Barnes and Q. D. Nguyen, Rotating vane rheometry—a review, J. Non-Newtonian Fluid Mech. vol. 98, 2001, pp. 1-14.

N. I. Heywood, Stop you slurries from stirring up trouble, Chem. Engr Proc. vol. 95, 1999, pp. 21-40.

(Continued)

*Primary Examiner* — Jafar Parsa
(74) *Attorney, Agent, or Firm* — Fish & Associates, PC (57) ABSTRACT

A method and apparatus for converting carbonaceous material to a stream of carbon rich gas, comprising heating a slurry feed containing the carbonaceous material in a hydrogasification process using hydrogen and steam, at a temperature and pressure sufficient to generate a methane and carbon monoxide rich stream in which the conversion time in the process is between 5 and 45 seconds. In particular embodiments, the slurry feed containing the carbonaceous material is fed, along with hydrogen, to a kiln type reactor before being fed to the fluidized bed reactor. Apparatus is provided comprising a kiln type reactor, a slurry pump connected to an input of the kiln type reactor, means for connecting a source of hydrogen to an input of the kiln type reactor; a fluidized bed reactor connected to receive output of the kiln type reactor for processing at a fluidizing zone, and a source of steam and a source of hydrogen connected to the fluidized bed reactor below the fluidizing zone. Optionally, a grinder can be provided in the kiln type reactor.

17 Claims, 4 Drawing Sheets

OTHER PUBLICATIONS

S. K. Majumder, K. Chandna, D. S. De and G. Kundu, Studies on flow characteristics of coal-oil-water slurry system, Int. J of Miner. Proc., vol. 79, 2006, pp. 217-224. Ayhan Demirbas, Thermochemical Conversion of Biomass to Liquid Products in the Aqueous Medium, *Energy Sources*, 27:1235-1243, 2005.

Kreda, Silvia et al, G-protein-coupled receptors as targets for gene transfer vectors using natural small-molecular ligands, *Nature Biotechnology*, vol. 18 Jun. 2000.

Olsen et al., Unit processes and principles of chemical enginnering, D.Van Nostrand Co., 1032, pp. 1-3, 1932.

Van der Laan, G.P., Thesis, University of Groningen, Netherlands, 1999.

Steynberg, A.; Dry, M., FT Technology Studies in surf Science and Catalysis, ec., vol. 152, 2005.

Sheldon, R.A. Chemicals from Synthesis Gas, 1983.

Hepola, Jouko et al, Sulphur poisoning of nickel-based hot gas cleaning catalysts in synthetic gasification gas I. Effect of different process parameters, *B. Environmental*, 14 (1997) 287-303.

Chen, lenwhei et al, Resistivity to Sulfur Poisoning of Nickel-Alumina Catalysts, *Ind. Eng. Chem. Res* 1988, 27, 1391-1396.

Sehested Jens, Four challenges for nickel steam-reforming catalysts, *catalysisToday*, 111 (2006) 103-110.

Tomita, Akira, et al., Sulfur Poisoning in the Nickel Catalyzed Gasification of Activated Carbon in Hydrogen, *Carbon*, vol. 21, No. 3 pp. 225-229, 1983.

METHOD AND APPARATUS FOR STEAM HYDRO-GASIFICATION WITH INCREASED CONVERSION TIMES

CROSS-REFERENCE TO RELATED APPLICATIONS

This application is a continuation-in-part of, and claims the benefit of U.S. patent application Ser. Nos. 11/489,353, filed Jul. 18, 2006 now abandoned, and 11/879,267 filed Jul. 16, 2007 now U.S. Pat. No. 7,619,012, of which are incorporated for reference in their entirety.

FIELD OF THE INVENTION

The field of the invention is the synthesis of transportation fuel from carbonaceous feed stocks.

BACKGROUND OF THE INVENTION

There is a need to identify new sources of chemical energy and methods for its conversion into alternative transportation fuels, driven by many concerns including environmental, health, safety issues, and the inevitable future scarcity of petroleum-based fuel supplies. The number of internal combustion engine fueled vehicles worldwide continues to grow, particularly in the midrange of developing countries. The worldwide vehicle population outside the U.S., which mainly uses diesel fuel, is growing faster than inside the U.S. This situation may change as more fuel-efficient vehicles, using hybrid and/or diesel engine technologies, are introduced to reduce both fuel consumption and overall emissions. Since the resources for the production of petroleum-based fuels are being depleted, dependency on petroleum will become a major problem unless non-petroleum alternative fuels, in particular clean-burning synthetic diesel fuels, are developed. Moreover, normal combustion of petroleum-based fuels in conventional engines can cause serious environmental pollution unless strict methods of exhaust emission control are used. A clean burning synthetic diesel fuel can help reduce the emissions from diesel engines.

The production of clean-burning transportation fuels requires either the reformulation of existing petroleum-based fuels or the discovery of new methods for power production or fuel synthesis from unused materials. There are many sources available, derived from either renewable organic or waste carbonaceous materials. Utilizing carbonaceous waste to produce synthetic fuels is an economically viable method since the input feed stock is already considered of little value, discarded as waste, and disposal is often polluting.

Liquid transportation fuels have inherent advantages over gaseous fuels, having higher energy densities than gaseous fuels at the same pressure and temperature. Liquid fuels can be stored at atmospheric or low pressures whereas to achieve liquid fuel energy densities, a gaseous fuel would have to be stored in a tank on a vehicle at high pressures that can be a safety concern in the case of leaks or sudden rupture. The distribution of liquid fuels is much easier than gaseous fuels, using simple pumps and pipelines. The liquid fueling infrastructure of the existing transportation sector ensures easy integration into the existing market of any production of clean-burning synthetic liquid transportation fuels.

The availability of clean-burning liquid transportation fuels is a national priority. Producing synthesis gas (which is a mixture of hydrogen and carbon monoxide) cleanly and efficiently from carbonaceous sources, that can be subjected to a Fischer-Tropsch type process to produce clean and valuable synthetic gasoline and diesel fuels, will benefit both the transportation sector and the health of society. A Fischer-Tropsch type process or reactor, which is defined herein to include respectively a Fischer-Tropsch process or reactor, is any process or reactor that uses synthesis gas to produce a liquid fuel. Similarly, a Fischer-Tropsch type liquid fuel is a fuel produced by such a process or reactor. Such a process allows for the application of current state-of-art engine exhaust after-treatment methods for $NO_x$ reduction, removal of toxic particulates present in diesel engine exhaust, and the reduction of normal combustion product pollutants, currently accomplished by catalysts that are poisoned quickly by any sulfur present, as is the case in ordinary stocks of petroleum derived diesel fuel, reducing the catalyst efficiency. Typically, Fischer-Tropsch type liquid fuels, produced from biomass derived synthesis gas, are sulfur-free, aromatic free, and in the case of synthetic diesel fuel have an ultrahigh cetane value.

Biomass material is the most commonly processed carbonaceous waste feed stock used to produce renewable fuels. Waste plastic, rubber, manure, crop residues, forestry, tree and grass cuttings and biosolids from waste water (sewage) treatment are also candidate feed stocks for conversion processes. Biomass feed stocks can be converted to produce electricity, heat, valuable chemicals or fuels. California tops the nation in the use and development of several biomass utilization technologies. Each year in California, more than 45 million tons of municipal solid waste is discarded for treatment by waste management facilities. Approximately half this waste ends up in landfills. For example, in just the Riverside County, California area, it is estimated that about 4000 tons of waste wood are disposed of per day. According to other estimates, over 100,000 tons of biomass per day are dumped into landfills in the Riverside County collection area. This municipal waste comprises about 30% waste paper or cardboard, 40% organic (green and food) waste, and 30% combinations of wood, paper, plastic and metal waste. The carbonaceous components of this waste material have chemical energy that could be used to reduce the need for other energy sources if it can be converted into a clean-burning fuel. These waste sources of carbonaceous material are not the only sources available. While many existing carbonaceous waste materials, such as paper, can be sorted, reused and recycled, for other materials, the waste producer would not need to pay a tipping fee, if the waste were to be delivered directly to a conversion facility. A tipping fee, presently at $30-$35 per ton, is usually charged by the waste management agency to offset disposal costs. Consequently not only can disposal costs be reduced by transporting the waste to a waste-to-synthetic fuels processing plant, but additional waste would be made available because of the lowered cost of disposal.

The burning of wood in a wood stove is a simple example of using biomass to produce heat energy. Unfortunately, open burning of biomass waste to obtain energy and heat is not a clean and efficient method to utilize the calorific value. Today, many new ways of utilizing carbonaceous waste are being discovered. For example, one way is to produce synthetic liquid transportation fuels, and another way is to produce energetic gas for conversion into electricity.

Using fuels from renewable biomass sources can actually decrease the net accumulation of greenhouse gases, such as carbon dioxide, while providing clean, efficient energy for transportation. One of the principal benefits of co-production of synthetic liquid fuels from biomass sources is that it can provide a storable transportation fuel while reducing the effects of greenhouse gases contributing to global warming.

In the future, these co-production processes could provide clean-burning fuels for a renewable fuel economy that could be sustained continuously.

A number of processes exist to convert coal, biomass, and other carbonaceous materials to clean-burning transportation fuels, but they tend to be too expensive to compete on the market with petroleum-based fuels, or they produce volatile fuels, such as methanol and ethanol that have vapor pressure values too high for use in high pollution areas, such as the Southern California air-basin, without legislative exemption from clean air regulations. An example of the latter process is the Hynol Methanol Process, which uses hydro-gasification and steam reformer reactors to synthesize methanol using a co-feed of solid carbonaceous materials and natural gas, and which has a demonstrated carbon conversion efficiency of >85% in bench-scale demonstrations.

Numerous gasification studies have demonstrated that partial oxidation (POX) of coal can produce energetic gases. The synthesis gas produced is used either as fuel to generate electricity in IGCC process or used as a feedstock to produce liquid fuels in gas-to-liquids (GTL) process. The partial oxidation process generally requires an oxygen generation plant, which requires high capital and operational cost. Another process was developed in the early 1930's where coal was gasified with hydrogen instead of air/oxygen. Hydro-gasification refers to the reaction of carbon and its char with hydrogen rich gas at 600-1000° C., with the main product being methane. The hydro-gasification process requires hydrogen as a feedstock and the reactions are extremely slower as compared to partial oxidation process. Due to these reasons hydro-gasification is normally carried out with a catalyst and in a reactor with high gas residence time.

All gasification processes usually require a dry feed for the process. The drying of the feedstock increases the cost of the overall process. In some cases slurry feed is used. The slurry feed does not require the feedstock to be dried before the gasification process. A high-pressure slurry pump is used to feed the slurry inside the reactor instead of a complex and cumbersome lock hopper system in case of a dry feed. The disadvantage associated with slurry feed is that the process requires additional source of heat to provide the sensible heat to the water in the slurry feed. Hence the slurry feed system for a POX hydro-gasification process does not seem to be feasible, since the hydro-gasification process relies on the external source of heat instead of internal heat which is generated by the combustion of the fraction of the feedstock in POX.

Of particular interest to the present invention are processes developed more recently in which a slurry of carbonaceous material is fed into a hydro-gasifier reactor. One such process was developed in our laboratories to produce synthesis gas in which a slurry of particles of carbonaceous material in water, and hydrogen from an internal source, are fed into a hydro-gasification reactor under conditions to generate rich producer gas. This is fed along with steam into a steam pyrolytic reformer under conditions to generate synthesis gas. This process is described in detail in Norbeck et al. U.S. patent application Ser. No. 10/503,435 (published as US 2005/0256212), entitled: "Production Of Synthetic Transportation Fuels From Carbonaceous Material Using Self-Sustained Hydro-Gasification."

In a further version of the process, using a steam hydro-gasification reactor (SHR) the carbonaceous material is heated simultaneously in the presence of both hydrogen and steam to undergo steam pyrolysis and hydro-gasification in a single step. This process is described in detail in Norbeck et al. U.S. patent application Ser. No. 10/911,348 (published as US 2005/0032920), entitled: "Steam Pyrolysis As A Process to Enhance The Hydro-Gasification of Carbonaceous Material." The disclosures of U.S. patent application Ser. Nos. 10/503,435 and 10/911,348 are incorporated herein by reference.

Fluidized bed reactors are well known and used in a variety of industrial manufacturing processes, for example in the petroleum industry to manufacture fuels as well as in petrochemical applications including coal gasification, fertilizers from coal, and industrial and municipal waste treatment. In the case of a POX system, the fluidized bed reactor can handle a wet feedstock since the reaction provides the sensible heat. The steam hydro-gasification process does not provide this heat internally since the reaction is not highly exothermic. It is not feasible to provide the excessive amount of heat externally to a fluidized bed reactor efficiently and rapidly in case of slurry feed. Hence it is clear that a reactor system optimized for the steam hydro-gasification does not exist. Moreover, because the operation of the fluidized bed reactor is generally restricted to temperatures below the softening point of the material being processed and slagging of materials such as ash will disturb the fluidization of the bed, fluidized bed reactors have had little if any use in the processing of many of the types of carbonaceous materials used as feed in hydro-gasification reactions. Moreover, tar formation is a typical problem of low temperature fluidized bed gasifiers with conventional technology. These problems can be amplified when scaling up. For example, attempts to scale up the Fischer-Tropsch type synthesis failed as described by Werther et al. in "Modeling of Fluidized Bed Reactors," International Journal of Chemical Reactor Engineering, Vol. 1:P1, 2003.

BRIEF SUMMARY OF THE INVENTION

Notwithstanding the above drawbacks, the present inventors realized that feedstocks used in hydro-gasification reactions, such as coal and biomass, can be sufficiently reactive to operate at the lower temperatures of fluidized bed processes. This invention provides an improved, economical alternative method of conducting hydro-gasification, by increasing conversion times. These increased conversion time processes can be operated using fluidized bed or kiln type reactors; or using a combination of fluidized bed and kiln type reactors.

In one embodiment, a process for converting carbonaceous material to a stream of carbon rich gas is provided, comprising heating a slurry feed containing the carbonaceous material in a hydrogasification process using hydrogen and steam, at a temperature and pressure sufficient to generate a methane and carbon monoxide rich stream in which the conversion time in the process is between 5 and 45 seconds.

In a particular implementation of the above embodiment, heating carbonaceous material in the slurry is performed in a kiln type reactor.

In another implementation of the above embodiment, the process is performed in a fluidized bed reactor. Use of a fluidized bed to conduct hydro-gasification provides extremely good mixing between feed and reacting gases, which promotes both heat and mass transfer. This ensures an even distribution of material in the bed, resulting in a high conversion rate compared to other types of gasification reactors.

In a particular embodiment, to optimize the performance of the fluidized bed reactor, two stages are provided. In a first stage, the carbonaceous material is fed as a slurry, along with hydrogen, to a kiln type reactor before being fed to the fluidized bed reactor. Optionally, a grinder can be provided in the kiln type reactor. In this two stage embodiment, the apparatus comprises a kiln type reactor, a slurry pump connected to an input of the kiln type reactor, means for connecting a source of hydrogen to an input of the kiln type reactor; a fluidized bed reactor connected to receive output of the kiln type reactor for processing at a fluidizing zone, and a source of steam and a source of hydrogen connected to the fluidized bed reactor below the fluidizing zone. In a more particularized embodiment, the slurry feed has a residence time in the kiln reactor of 10-200 seconds. The conversion time during the entire two stage process can be between 5 and 45 seconds.

We have found that the steam hydro-gasification reaction (SHR), such as described in the above-referred-to U.S. patent application Ser. No. 10/911,348, is particularly well suited for being conducted in a fluidized bed reactor. Because SHR usually is operated under the ash slagging temperature, the hydrogen feed of the SHR, optionally combined with the steam, can be used as the fluidized medium. The reducing environment of hydro-gasification suppresses tar formation, which avoids the problems described above. The fluidized bed reactor is good in achieving an overall mixing of the solid feed with the gases in the reactor.

In a particular implementation of the invention, the output of the fluidized bed reactor is used as feedstock for a steam methane reformer (SMR), which is a reactor that is widely used to produce synthesis gas for the production of liquid fuels and chemicals, for example in a Fischer-Tropsch type reactor (FTR).

More particularly in the present invention, carbonaceous material, which can comprise municipal waste, biomass, wood, coal, or a natural or synthetic polymer, is converted to a stream of methane and carbon monoxide rich gas by heating the carbonaceous material in a fluidized bed reactor using steam and/or hydrogen, preferably both, as fluidizing medium at a temperature and pressure sufficient to generate a stream of methane and carbon monoxide rich gas but at a temperature low enough and/or at a pressure high enough to enable the carbonaceous material to be fluidized by the hydrogen or by a mixture of hydrogen and steam. Preferably, the temperature is about 700° C. to about 900° C. at a pressure of about 132 psi to 560 psi, preferably 150-400 psi. Impurities are removed from the stream of methane and carbon monoxide rich gas at substantially the pressure of the fluidized bed reactor at a temperature above the boiling point of water at the process pressure.

Increased conversion times of between 5-45 seconds in hydrogasification processes, using kiln type, fluidized bed type, or combination of both reactors, result in substantial increase in conversion of carbonaceous material into carbon rich gases. By increasing conversion time (also known as gas residence time), more carbon rich gas is produced instead of tar (liquid material from incomplete conversion) or char (unconverted solid material).

In a preferred embodiment, a slurry of the carbonaceous material is fed with hydrogen at a first stage to a kiln type reactor at 300-600° C. and at a pressure of 132-560 psi. At a second stage, the output from the kiln type reactor is fed to a fluidized bed reactor using hydrogen as fluidizing medium, and using steam, at a temperature of about 700° C. to about 900° C. at said pressure whereby to generate a stream of methane and carbon monoxide rich producer gas. The total conversion time in the entire two stage process is between 5 and 45 seconds.

In utilizing the methods, the stream of methane and carbon monoxide rich gas is subjected to steam methane reforming under conditions whereby synthesis gas comprising hydrogen and carbon monoxide is generated. In a further preferred method, synthesis gas generated by the steam methane reforming is fed into a Fischer-Tropsch type reactor under conditions whereby a liquid fuel is produced. Exothermic heat from the Fischer-Tropsch type reaction can be transferred to the hydro-gasification reaction and/or steam methane reforming reaction.

BRIEF DESCRIPTION OF THE DRAWINGS

For a more complete understanding of the present invention, reference is now made to the following description taken in conjunction with the accompanying drawing, in which.

DETAILED DESCRIPTION OF THE INVENTION

Carbonaceous material is defined herein to mean any solid and/or liquid and/or gas material containing carbon, preferably solid.

Carbon rich gas is defined herein to mean any gaseous species containing carbon.

Conversion time is defined herein as the time the carbonaceous material remains inside the reaction zone of the reactor.

Kiln type reactors, as conventionally used, can be used to perform hydrogasification. The temperatures used in such processes are 700-900° C.; the pressures used are 132-560 psi; increased carbon rich gas conversion times of between 5-45 seconds can be achieved in kiln type hydrogasification reactors by increasing the reaction zone volume.

Figure 1:
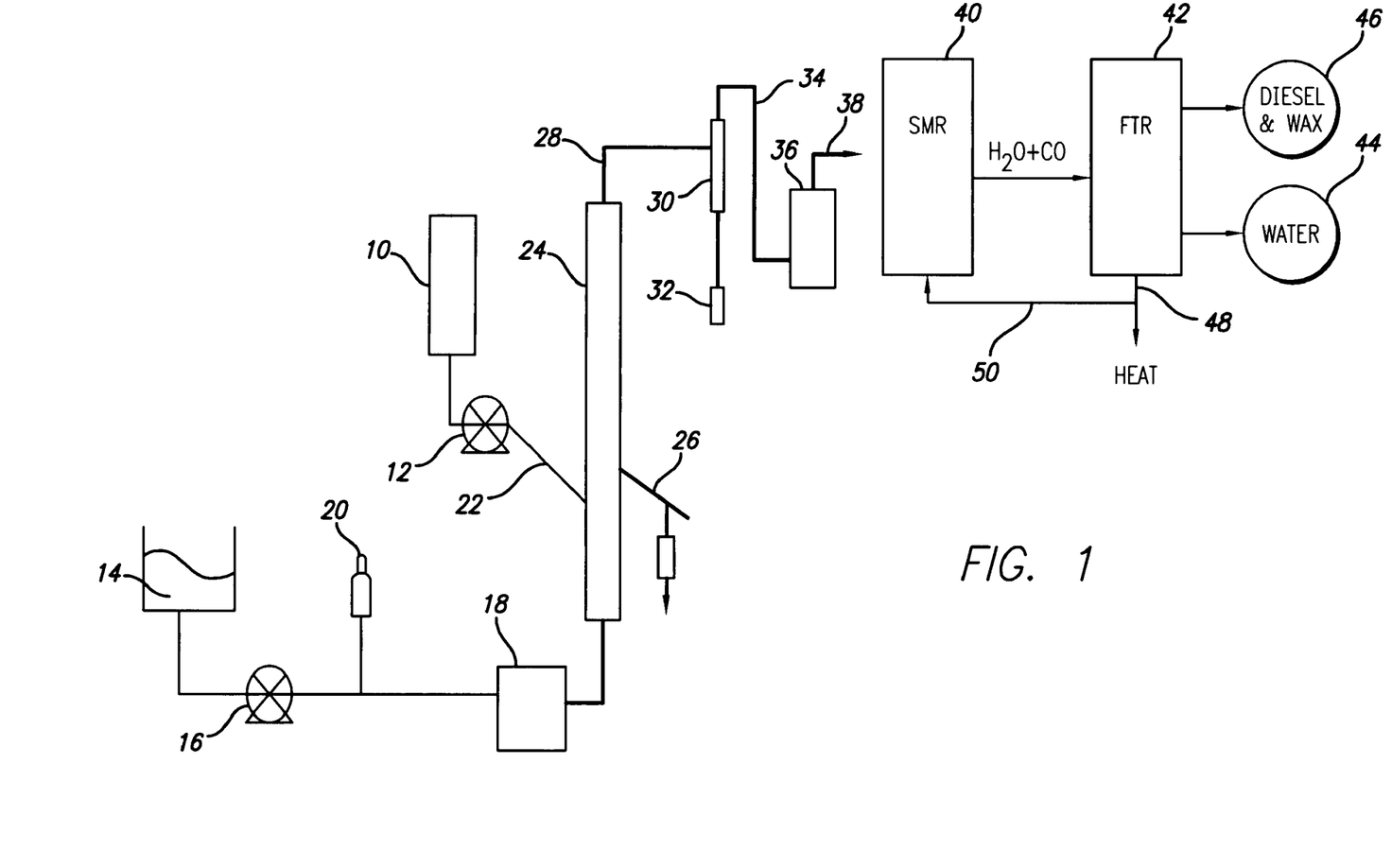
FIG. 1 is a schematic flow diagram of a first embodiment in which a steam hydro-gasification reaction is conducted in a fluidized bed reactor.

Referring to FIG. 1, Apparatus is shown in accordance with an embodiment of the invention for a process for converting carbonaceous material such as municipal waste, biomass, wood, coal, or a natural or synthetic polymer to a methane and carbon monoxide rich gas. A slurry feed containing the carbonaceous material is loaded into a slurry feed tank 10 and gravity fed to a slurry pump 12. In this embodiment, water from a water tank 14 is fed by a water pump 16 to a steam generator 18. Simultaneously, hydrogen is fed to the steam generator 18, which can be from a tank 20 of hydrogen, from an internal source such as the output from a downstream steam methane reformer (as will be described below), or from both. The output of the slurry pump 12 is fed through line 22 to the bottom of a fluidized bed reactor 24 while the output from the steam generator 18 is fed through line 25 to the fluidized bed reactor 24 at a point below the slurry of carbonaceous material.

In another embodiment, the hydrogen is fed directly to the fluidized bed reactor 24 at a point below the slurry of carbonaceous material while the feed from the steam generator is introduced at a point above the input of the slurry of carbonaceous material, i.e., downstream of the point of introduction of the carbonaceous material.

The fluidized bed reactor 18 operates as a steam hydro-gasification reactor (SHR) at a temperature of about 700° C. to about 900° C. and pressure about 132 psi to 560 psi, preferably 150-400 psi, to generate a stream of methane and carbon monoxide rich gas, which can also be called a producer gas. The chemical reactions taking place in this process are described in detail in Norbeck et al. U.S. patent application Ser. No. 10/911,348 (published as US 2005/0032920), entitled: "Steam Pyrolysis As A Process to Enhance The Hydro-Gasification of Carbonaceous Material." The disclosure of U.S. patent application Ser. No. 10/911,348 is incorporated herein by reference.

The ash slagging temperature in the fluidized bed reactor 24 is sufficiently low and the pressure sufficiently high that a fluidized bed reaction can be use. The reducing environment of fluidized bed reactor 24 also suppresses tar formation.

Ash and char, as well as hydrogen sulfide and other inorganic components from the fluidized bed reactor 18 are disposed of through line 26 and its output is fed through line 28 into a heated cyclone 30 which separates out fine particles at 32. The output from the heated cyclone 30 is fed through line 34 to a hot gas filter 36, then through line 38 to a steam methane reactor 40.

At the steam methane reformer 40, synthesis gas is generated comprising hydrogen and carbon monoxide at a $H_2$:CO mole ratio range of about 3 to 1. The hydrogen/carbon monoxide output of the steam methane reformer 40 can be used for a variety of purposes, one of which is as feed to a Fischer-Tropsch reactor 42 from which pure water 44 and diesel fuel and/or wax 46. Exothermic heat 48 from the Fischer-Tropsch reactor 42 can be transferred to the steam methane reformer 40 as shown by line 50.

The required $H_2$:CO mole ratio of a Fischer-Tropsch reactor with a cobalt based catalyst is 2:1. Accordingly, there is an excess of hydrogen from the steam methane reformer 40, which can be separated and fed into the fluidized bed reactor 24 (by lines not shown) to make a self-sustainable process, i.e., without requiring an external hydrogen feed.

Figure 3:
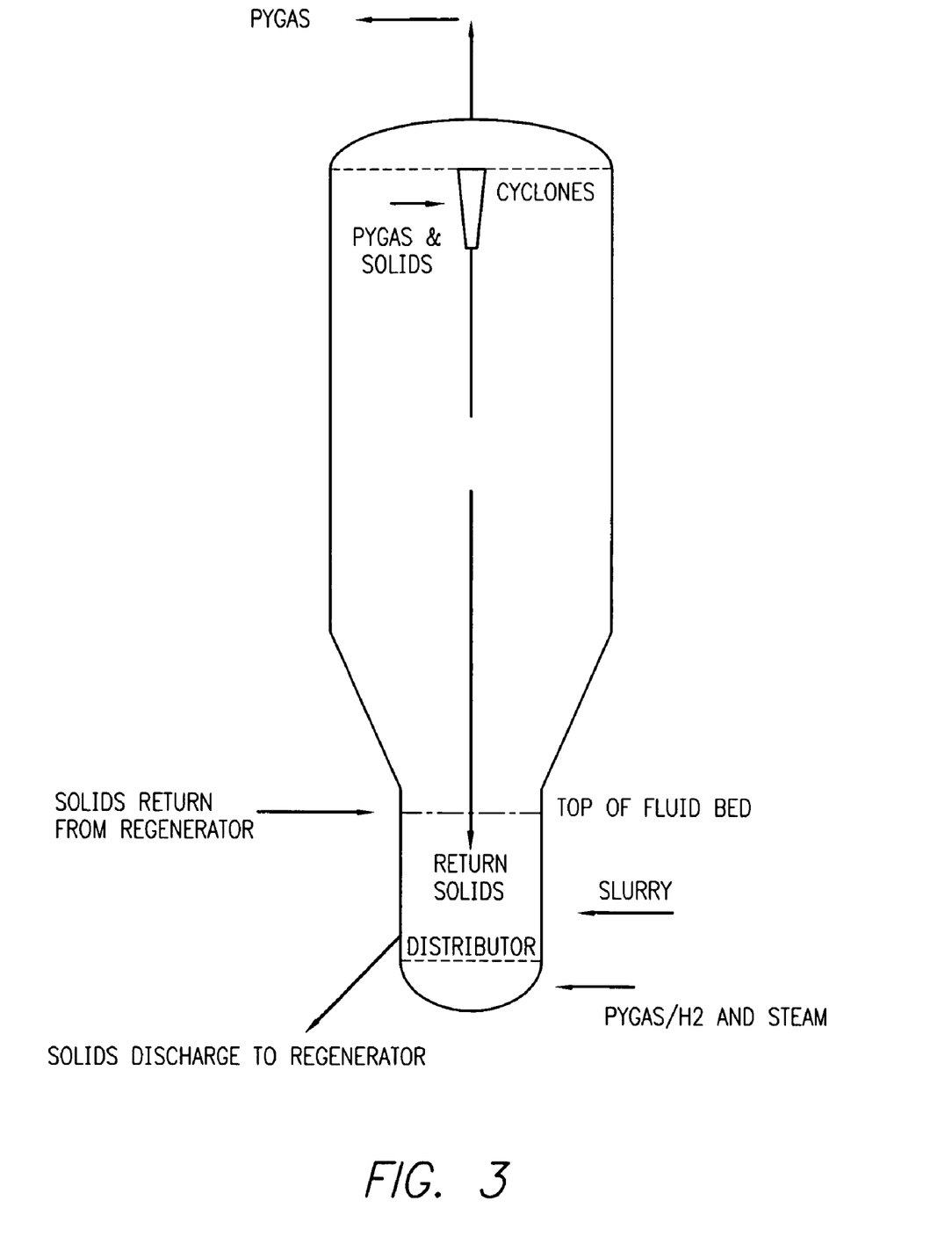
FIG. 3 shows a diagrammatic representation of a fluidized bed reactor capable of providing increased conversion times.

FIG. 3 shows a diagram of a fluidized bed reactor of the first embodiment in which conversion times are increased to 35 seconds by increasing the reactor volume, or more specifically, the "free board volume." The desired reactor volume required to achieve a 5-45 second conversion time within the fluidized bed reactor can also be determined by a number of factors, such as the gas velocity utilized within the fluidized bed reactor, composition of gas (for example steam flow rate and hydrogen flow rate ratio), and physical characteristics of the sand material which is used for the fluidizing medium.

Figure 4:
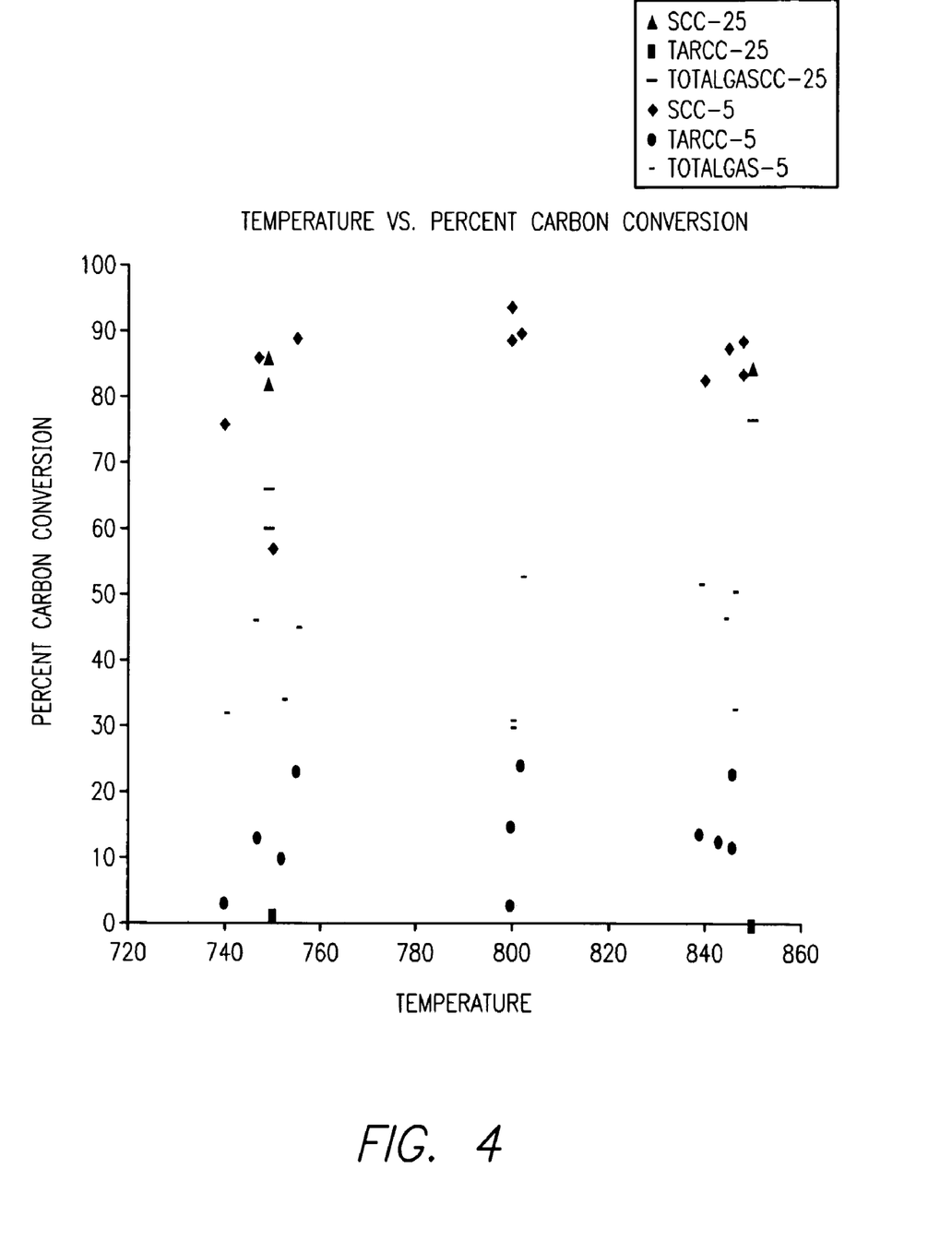
FIG. 4 shows a graph illustrating the effect of increasing conversion times in a fluidized bed reactor by decreasing hydrogen gas velocity.

FIG. 4 shows a graph that illustrates with the first embodiment the effect of increasing conversion times from 5 seconds to 25 seconds on SSC, TarCC and total GasCC values.

The table below shows results obtained for the 5 and 25 second conversion times at 750-850° C. and at 180 psi:

|  | Conversion times of 5 seconds | Conversion times of 25 seconds |
| --- | --- | --- |
| Total conversion efficiency into carbon rich product gas | 45-50% | 60-70% |
| % of total carbon converted into tar | 5-25 | <0.1 (at 850° C.) 0.6 (at 750° C.) |
| % of total carbon converted into char | 30-40 | 30% |

These results clearly show that increasing conversion times can significantly improve the total conversion efficiencies into carbon rich product gas by reducing the % of total carbon converted into tar.

Also under both 5 and 25 second conversion times all of the sulphur was converted into H2S, and there was no negligible carbonyl sulfide (COS).

Figure 2:
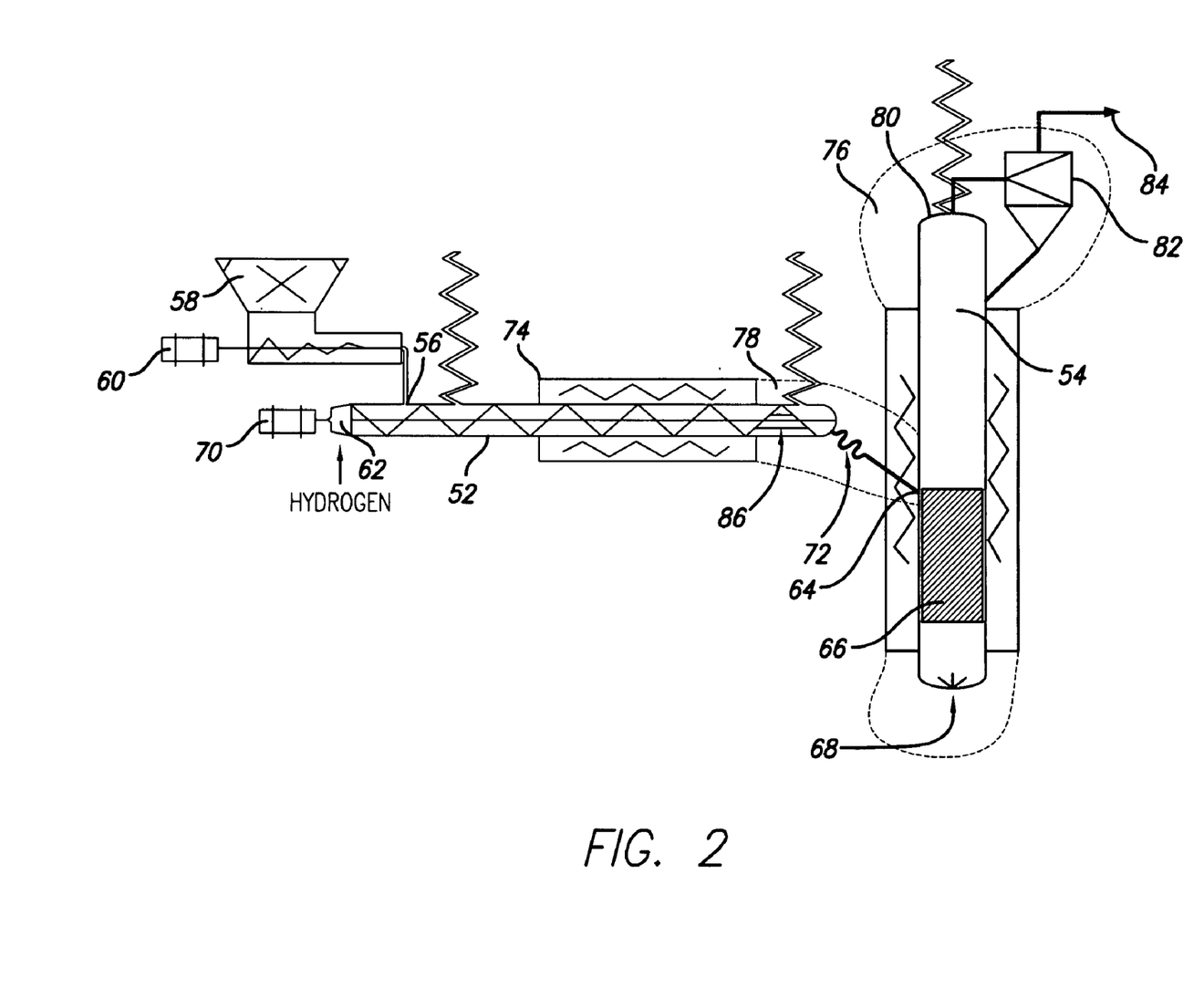
FIG. 2 is a schematic flow diagram of a second embodiment in which the steam hydro-gasification reaction is conducted using a two stage steam hydro-gasifier comprising a kiln type reactor and a fluidized bed reactor.

Referring now to FIG. 2, a second, preferred embodiment is shown using a steam hydro-gasification reactor (SHR) system that involves two stages to carry out the steam hydro-gasification. The first stage is a kiln type reactor (KGR) 52 followed by the second stage of a fluidized bed reactor (CFBR) 54. The KGR 52 uses a slurry and hydrogen as the feeds. The slurry feed is a mixture of a carbonaceous feedstock and water and is delivered to an input 56 of the KGR 52 by a pressure cavity slurry pump 58, driven by motor 60. The hydrogen feed is delivered to another input 62 of the KGR 52. The product gases and solids coming from the KGR enter the CFBR at an input 64 of the CFBR at the top of the fluidized zone 66. Steam and hydrogen, at 68, are used to fluidize the feed in the CFBR 54. This reactor system is designed to handle a slurry feed and achieve high conversion of the carbonaceous feedstock. The gases are allowed to achieve high gas residence time inside the reactor system to attain equilibrium.

The KGR 52 is driven by a motor 70, is connected to the CFBR 54 input 64 by a flexible coupling 72, and is heated electrically at 74. In an alternative embodiment, jacketed heat from the product output could be used to heat the KGR 52. Insulation encloses the CFBR and the output region of the KGR, shown in shadow at 76 and 78. Product is from the output end 80 of the CFBR goes through a cyclone 82 to provide product gas 84.

Optionally, one can provide a feed grinder 86, which can be located internally of the KGR 52 at its output end, to further facilitate delivery of processed slurry feed to the CFBR 54.

In the first stage the feed devolatilization takes place. The KGR 52 acts as a preheater for the devolatilization of the slurry. It is an effective system to heat the feed and also achieve a partial conversion of the feed before it enters the CFBR 54. The CFBR achieves a uniform mixing of the gases and the solids inside the reactor and increases the conversion further by steam hydro-gasification reactions at the higher temperature.

As in the first embodiment, the SHR produces a steam and methane rich product gas from the feedstock, where the steam is present as a result of the superheating of the water fraction of the slurry feed. The steam and methane rich stream coming out of the gas cleanup unit is fed into the SMR. The SMR produces a product gas stream consisting mostly of $H_2$ and CO. The $H_2$/CO ratio is initially high and a predetermined fraction of this high ratio syngas is recycled back to the SHR.

In a particular implementation of the two stage steam hydro-gasifier, the KGR 52 is 80 inches long, with a reaction zone of 4 feet and operates at a devolatilization temperature of 600° C. at a pressure of 200 psi. The CFBR operates at 850° C. at a pressure of 200 psi, and is a total of 8 feet long in which the fluidized zone is 3 feet long and the "free board" above the fluidized zone is 4 feet long. The solids residence time in the KGR 52 is 100 seconds. The conversion time is 45 seconds.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include such processes and use of such apparatuses within their scope.

The invention claimed is:

1. A process for converting carbonaceous material to a stream of carbon rich gas, comprising:
   heating a slurry feed containing the carbonaceous material in a hydrogasification process using hydrogen and steam, at a temperature between 700-900° C. and a pressure sufficient to generate a methane and carbon monoxide rich stream in which the conversion time in the process is between 5 and 45 seconds; and
   removing impurities from the stream of methane and carbon monoxide rich gas at a temperature above a boiling point of water at the pressure.

2. The process of claim 1 wherein the carbonaceous material is solid.

3. The process of claim 1 wherein the carbonaceous material is liquid or gas.

4. The process of claim 1 in which heating the slurry feed containing carbonaceous material is performed in a fluidized bed reactor at a temperature low enough and/or at a pressure high enough to enable the carbonaceous material to be fluidized.

5. The process of claim 1 in which heating the slurry feed containing carbonaceous material is performed in a kiln type reactor.

6. The process of claim 1 in which heating the slurry feed containing carbonaceous material is performed in a kiln type reactor before being fed to a fluidized bed reactor.

7. The process of claim 6 the slurry feed is heated in the kiln type reactor at 300-600° C. and 150-400 psi.

8. The process of claim 7 in which the solid in the slurry feed has a residence time in the kiln type reactor of 10-200 seconds.

9. The process of claim 5 in which the particle size of solid is further reduced in the kiln type reactor.

10. The process of claim 1 in which the impurities are removed from the stream of methane and carbon monoxide rich gas at substantially the pressure of the fluidized bed reactor.

11. The process of claim 1 including the step of subjecting the stream of methane and carbon monoxide rich gas to steam methane reforming under conditions whereby synthesis gas comprising hydrogen and carbon monoxide is generated.

12. The process of claim 11 in which synthesis gas generated by the steam methane reforming is fed into a Fischer-Tropsch type reactor under conditions whereby a liquid fuel is produced.

13. The process of claim 1 conducted under reducing conditions.

14. The process of claim 1 wherein the pressure is between 132 psi to 560 psi.

15. A process for converting carbonaceous material to a stream of carbon rich gas, comprising:
   forming a slurry of the carbonaceous material and feeding the slurry with hydrogen at a first stage to a kiln type reactor at a temperature of 300-600° C. and a pressure of 132-560 psi to thereby form an output;
   at a second stage, feeding the output from the kiln type reactor to a fluidized bed reactor using hydrogen as fluidizing medium, and using steam, at a temperature of about 700° C. to about 900° C. at said pressure to generate a stream of methane and carbon monoxide rich producer gas;
   removing impurities from the stream of methane and carbon monoxide rich producer gas at a temperature above a boiling point of water at said pressure to thereby form a cleaned producer gas;
   subjecting the cleaned producer gas to steam methane reforming under conditions whereby to generate synthesis gas comprising hydrogen and carbon monoxide,
   wherein a total conversion time of the first and second stages is between 5-45 seconds.

16. The process of claim 15 wherein the pressure is about 150-400 psi.

17. The process of claim 15 comprising using heat from the product output to heat the kiln type reactor.

* * * * *